United States Patent [19]

Ito et al.

[11] Patent Number: 5,331,464
[45] Date of Patent: Jul. 19, 1994

[54] ZOOM LENS SYSTEM

[75] Inventors: Takayuki Ito; Sachio Hasushita, both of Tokyo, Japan

[73] Assignee: Asahi Kogaku Kogyo Kabushiki Kaisha, Tokyo, Japan

[21] Appl. No.: 861,520

[22] Filed: Apr. 1, 1992

[30] Foreign Application Priority Data

Apr. 1, 1991 [JP] Japan ................................. 3-144300

[51] Int. Cl.$^5$ ............................................ G02B 15/14
[52] U.S. Cl. ...................................... 359/691; 359/740
[58] Field of Search ............... 359/683, 685, 691, 738, 359/739, 740, 793

[56] References Cited

U.S. PATENT DOCUMENTS

| | | | |
|---|---|---|---|
| 4,367,927 | 1/1983 | Fujii | 359/681 |
| 4,662,723 | 5/1987 | Imai | 359/691 X |
| 4,730,906 | 3/1988 | Okudaira | 359/680 |
| 4,909,615 | 3/1990 | Ueda | 359/680 X |
| 5,076,677 | 12/1991 | Sato | 359/691 X |
| 5,153,777 | 10/1992 | Okada et al. | 359/739 X |

Primary Examiner—William L. Sikes
Assistant Examiner—David R. Parsons
Attorney, Agent, or Firm—Sughrue, Mion, Zinn, Macpeak & Seas

[57] ABSTRACT

A zoom lens system comprises, in order from the object side, a negative first lens group N, a diaphragm stop A, a positive second lens group P and a blocking element B for blocking deleterious rays of light, with the first and second lens groups N and P movable for zooming, and with the diaphragm stop A moving independently of the second lens group P during zooming. The lens system satisfies the conditions $2.5 < X_s/f_s < 3.0$, $0 < \Delta X_A/f_s < X_2/f_s$, and $0 \leq \Delta X_B/f_s < \Delta X_2/f_s$, where $X_s$ is the distance from the diaphragm stop to the image plane at the wide-angle end, $f_s$ is the focal length of the overall system at the wide-angle end, $\Delta X_A$ is the range of movement of the diaphragm stop, and $\Delta X_B$ is the range of movement of the second lens group. This lens system has the diaphragm stop disposed in the appropriate position so that the compactness of lens barrel will not be impaired even if a motor is incorporated in it, and yet the system is capable of preventing the occurrence of deleterious flare rays of light.

15 Claims, 7 Drawing Sheets

FIG. 2
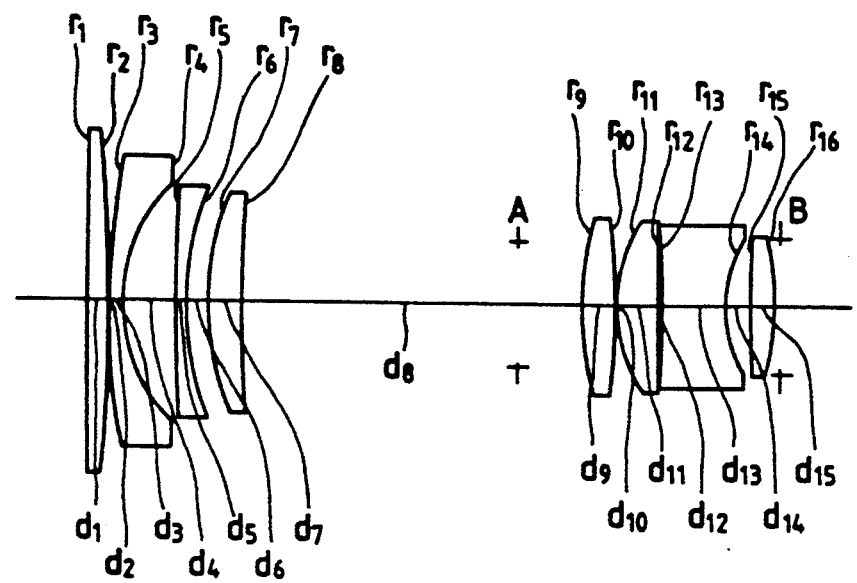
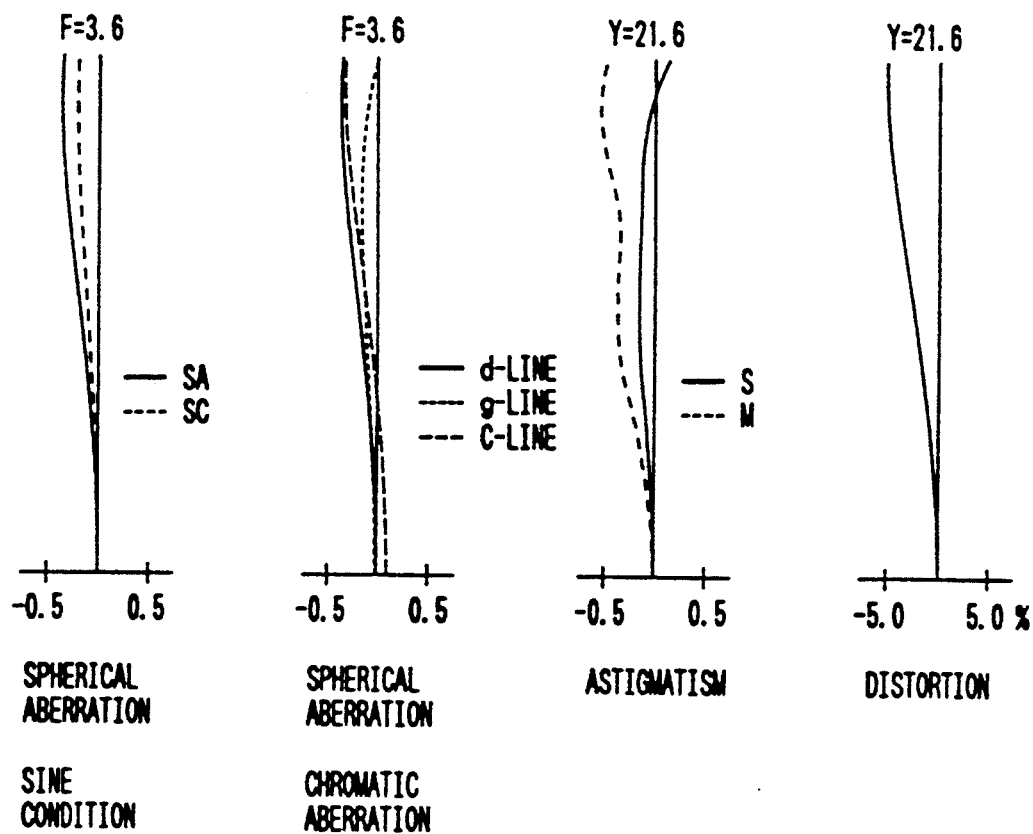
FIG. 3(a)  FIG. 3(b)  FIG. 3(c)  FIG. 3(d)
F=3.6 — SPHERICAL ABERRATION, SINE CONDITION (SA, SC)
F=3.6 — SPHERICAL ABERRATION, CHROMATIC ABERRATION (d-LINE, g-LINE, C-LINE)
Y=21.6 — ASTIGMATISM (S, M)
Y=21.6 — DISTORTION FIG. 9 (a) F=3.6
FIG. 9 (b) F=3.6
FIG. 9 (c) Y=21.6
FIG. 9 (d) Y=21.6

SPHERICAL ABERRATION

SPHERICAL ABERRATION

ASTIGMATISM

DISTORTION

SINE CONDITION

CHROMATIC ABERRATION

FIG. 10
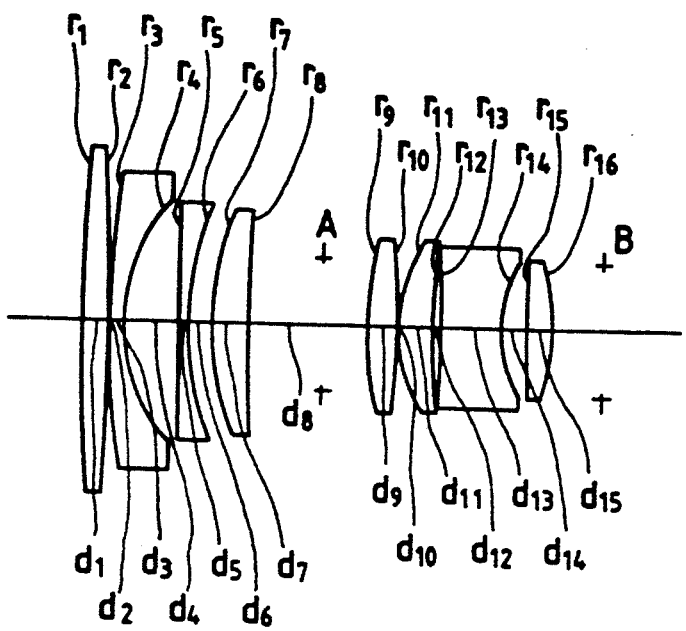
FIG. 11
(a) F=4.6
SPHERICAL
ABERRATION
SINE
CONDITION
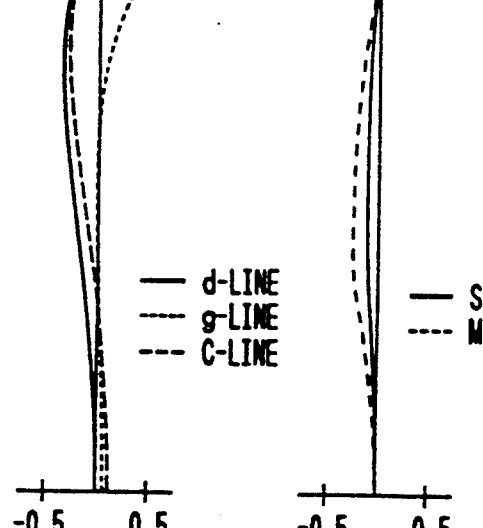
FIG. 11
(b) F=4.6
SPHERICAL
ABERRATION
CHROMATIC
ABERRATION
FIG. 11
(c) Y=21.6
ASTIGMATISM
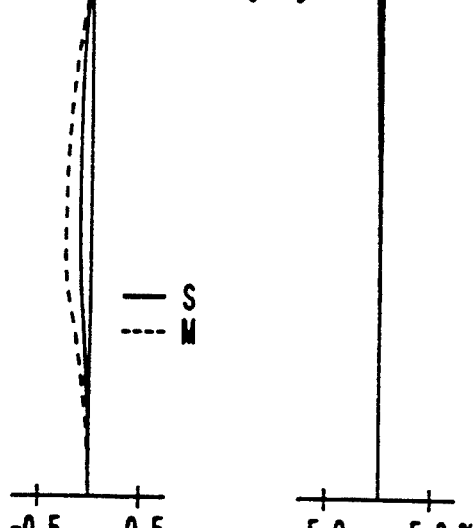
FIG. 11
(d) Y=21.6
DISTORTION FIG. 13 (a) F=4.8 — SA, --- SC  SPHERICAL ABERRATION  SINE CONDITION FIG. 13 (b) F=4.8 — d-LINE, — g-LINE, --- C-LINE  SPHERICAL ABERRATION  CHROMATIC ABERRATION FIG. 13 (c) Y=21.6 — S, --- M  ASTIGMATISM FIG. 13 (d) Y=21.6  DISTORTION

ZOOM LENS SYSTEM

BACKGROUND OF THE INVENTION

This application is based on and claims priority from Japanese Application No. HEI 3-144300 filed Apr. 1, 1991, the disclosure of which is incorporated by reference herein.

The present invention relates to a zoom lens system, and more particularly to a two-group zoom lens system for a power zooming monitor.

Standard zoom lens systems which have a focal length coverage from the wide-angle end to a sub-telephoto end are generally composed of two lens groups, a negative first lens group and a positive second lens group, as arranged in order from the object side. The diaphragm stop in such standard lens systems is customarily disposed either ahead of or within the second lens group so that it moves in unison with the second lens group upon zooming.

Such conventional zoom lens systems are sometimes designed as power zoom lenses which have a lens drive motor built in the lens barrel to achieve zooming. In this case, however, the motor is inevitably disposed outside the diaphragm stop, thereby increasing the diameter of the lens barrel.

Unexamined Published Japanese Patent Application No. 266511/1987 discloses a zoom lens system for use with video cameras that has a fixed diaphragm stop disposed between the first and the second lens groups. However, this lens system which uses a fixed diaphragm stop suffers from the disadvantage that deleterious flare rays of light are produced upon zooming.

SUMMARY OF THE INVENTION

The present invention has been accomplished under the circumstances described above, and it is an object of the present invention to provide a zoom lens system that has a diaphragm stop disposed in the appropriate position so that the compactness of lens barrel will not be impaired even if a motor is incorporated in the zoom lens system, which system is yet capable of preventing the occurrence of "deleterious flare rays of light".

The above and other objects are achieved by a zoom lens system comprising, in order from the object side, a negative first lens group, a diaphragm stop, a positive second lens group and a blocking means for blocking "deleterious flare rays of light", with said first and second lens groups being movable for zooming, with said diaphragm stop moving independently of said second lens group during zooming, and wherein the following conditions are satisfied:

$$2.5 < X_s/f_s < 3.0 \quad (1)$$

$$0 < \Delta X_A/f_s < \Delta X_2/f_s \quad (2)$$

$$0 \leq \Delta X_B/f_s < \Delta X_2/f_s \quad (3)$$

where $X_s$ is the distance from said diaphragm stop to the image plane at the wide-angle end; $f_s$ is the focal length of the overall system at the wide-angle end; $\Delta X_A$ is the range of movement of the diaphragm stop; $\Delta X_B$ is the range of movement of the blocking means; and $\Delta X_2$ is the range of movement of the second lens group.

The term "deleterious flare rays of light" is used to mean both flare as coma aberration of normal rays of light relative to forming an image and flare as ghost light which is reflected at edge portions of lens elements and a lens barrel to enter the focal plane.

BRIEF DESCRIPTION OF THE DRAWINGS

The invention will be more clearly understood from the following description in conjunction with the accompanying drawings, wherein:

FIG. 2 is a simplified cross-sectional view of the lens system of a first example at the wide-angle end;

FIGS. 3A-3D are a set of graphs plotting the aberration curves obtained with the lens system of FIG. 2 at the wide-angle end;

FIGS. 9A-9D are a set of graphs plotting the aberration curves obtained with the lens system of FIG. 8 at the wide-angle end;

FIG. 10 is a simplified cross-sectional view of the lens system of FIG. 8 in the middle-angle position;

FIGS. 11A-11D are a set of graphs plotting the aberration curves obtained with the lens system of FIG. 10 in the middle-angle position;

FIGS. 13A-13D are a set of graphs plotting the aberration curves obtained with the lens system of FIG. 12 at the narrow-angle end.

DETAILED DESCRIPTION OF THE INVENTION

Figure 1:
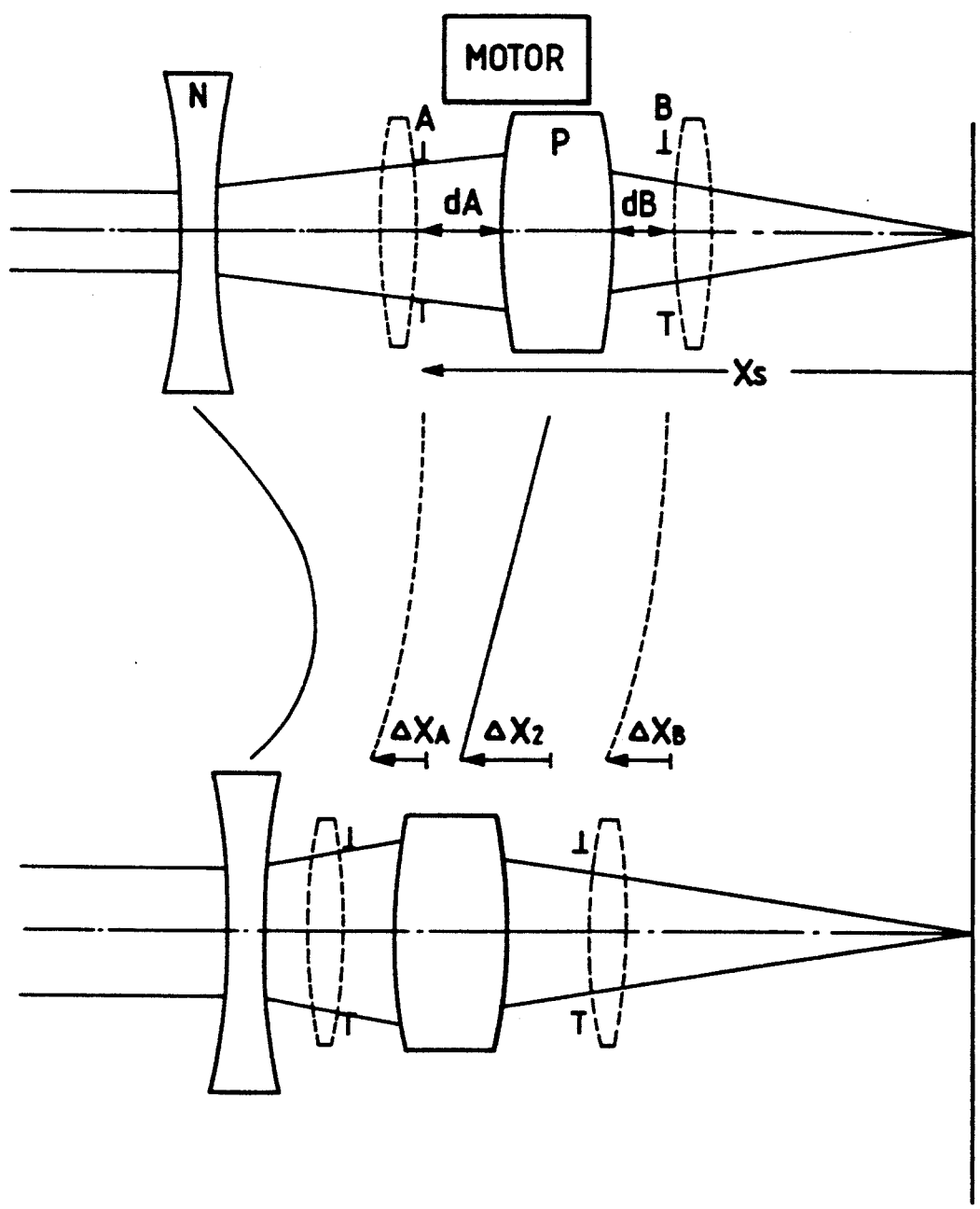
FIG. 1 is a schematic diagram illustrating the basic construction of the zoom lens system of the present invention.

As shown in FIG. 1, the zoom lens systems according to the present invention comprises, in order from the object side, a negative first lens group N, a diaphragm stop A, a positive second lens group P and a blocking means B for blocking deleterious flare rays of light. A zooming motor is built in the lens barrel drives the two lens groups N and P, as well as the diaphragm stop A and the blocking means B, to effect zooming. Optionally, a lens component of weak power may be provided in association with each of the diaphragm stop A and the blocking means B, as shown by dotted lines in FIG. 1, so that they can be moved in unison.

The zoom lens system of the present invention further satisfies the following conditions:

$$2.5 < X_s/f_s < 3.0 \quad (1)$$

$$0 < \Delta X_A/f_s < \Delta X_2/f_s \quad (2)$$

$$0 \leq \Delta X_B/f_s < \Delta X_2/f_s \quad (3)$$

where $X_s$ is the distance from the diaphragm stop to the image plane at the wide-angle end; $f_s$ is the focal length of the overall system at the wide-angle end; $\Delta X_A$ is the range of movement of the diaphragm stop; $\Delta X_B$ is the range of movement of the blocking means; and ΔX2 is the range of movement of the second lens group.

Condition (1) specifies the distance Xs from diaphragm stop A to the image plane in terms of its relative ratio to the focal distance fs. If the lower limit of this condition is not reached, diaphragm stop A is positioned so close to the image plane that considerable difficulty is involved in incorporating a drive motor. If the upper limit of condition (1) is exceeded, the diaphragm stop at the wide-angle end is positioned so close to the object that the diameter of the second lens group P would need to be increased.

Condition (2) specifies the relationship between the ranges of movement of diaphragm stop A and the second lens group P. If the lower limit of this condition is not reached, the distance between the diaphragm stop A and the second lens group P becomes excessive, increasing the amount of deleterious flare rays that are produced in the range from the wide-angle end to the middle-angle position. It should be noted that deleterious flare rays can be blocked more effectively by setting the diaphragm stop to have a smaller aperture diameter at the wide-angle end. If ΔXA/fs exceeds ΔX2/fs, diaphragm A becomes positioned so close to the image plane that considerable difficulty is involved in incorporating a drive motor.

Condition (3) should be satisfied in order to block any deleterious flare rays that will develop in the range from the middle-angle position to the narrow-angle end. If the lower limit of this condition is not reached, the aperture in the blocking means B will need not be increased in diameter in order to insure the necessary quantity of light at a maximum view angle at the narrow-angle end, and this makes it impossible to block any deleterious flare rays. If ΔXB/fs exceeds ΔX2/fs, the blocking means B will not function effectively.

If construction per, nits, the diameter of the aperture in the blocking means B may be made variable, and this generally helps achieve more effective blocking of deleterious flare rays that will develop in the range from the middle-angle position to the narrow-angle end. Further, a simple structural design can be accomplished by adapting the diaphragm stop A and the blocking means B to be movable in unison.

EXAMPLE 1

FIG. 2 is a simplified cross-sectional view of a zoom lens system according to a first example (Example 1) at the wide-angle end, and FIGS. 3A–3D are a set of graphs potting the aberration curves obtained with that lens system. Specific numerical data for the lens systems are given in Tables 1 and 2, in which r denotes the radius of curvature, d is the distance between lens surfaces, N is the refractive index, $\nu$ is the Abbe number, FNo. is the aperture ratio, f is the focal length, $\omega$ is the half view-angle, and fB is the back focus.

TABLE 1

| Surface No. | r | d | N | $\nu$ |
|---|---|---|---|---|
| 1 | 1000.000 | 2.88 | 1.72000 | 46.0 |
| 2 | −297.746 | 0.10 | — | |
| 3 | 106.695 | 1.93 | 1.83400 | 37.2 |
| 4 | 23.311 | 7.08 | — | |
| 5 | 339.964 | 1.60 | 1.77250 | 49.6 |
| 6 | 42.302 | 2.93 | — | |
| 7 | 36.155 | 4.70 | 1.80518 | 25.4 |
| 8 | 174.306 | variable | — | |
| 9 | 47.094 | 4.30 | 1.67003 | 47.3 |
| 10 | −96.861 | 0.10 | — | |

TABLE 1-continued

| Surface No. | r | d | N | $\nu$ |
|---|---|---|---|---|
| 11 | 20.394 | 5.57 | 1.51454 | 54.7 |
| 12 | 352.297 | 0.70 | — | |
| 13 | −145.314 | 8.59 | 1.80518 | 25.4 |
| 14 | 18.530 | 3.30 | — | |
| 15 | 151.526 | 3.20 | 1.56732 | 42.8 |
| 16 | −35.485 | — | — | |

TABLE 2

| Fno. | 1:3.7 | 1:4.6 | 1:4.9 |
|---|---|---|---|
| f | 28.90 | 52.00 | 77.60 |
| $\omega$ | 38.2 | 22.7 | 15.5 |
| fb | 43.50 | 56.40 | 76.20 |
| d8 | 47.40 | 16.74 | 4.08 |

Figure 4:
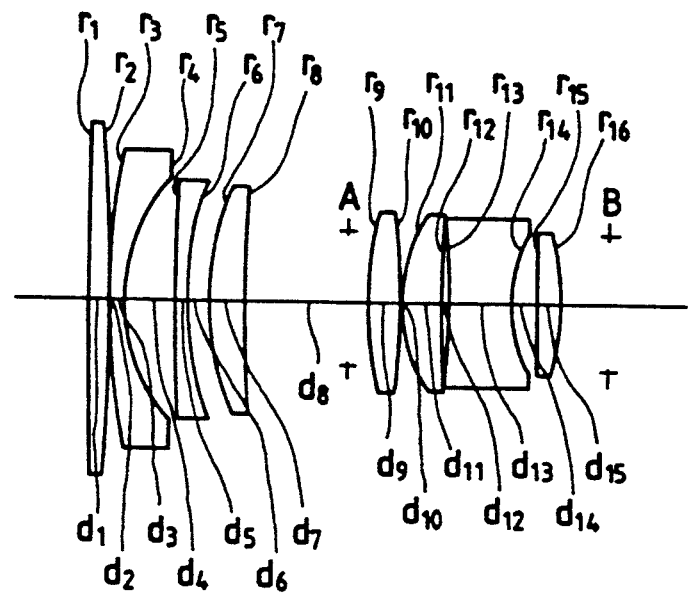
FIG. 4 is a simplified cross-sectional view of the lens system of FIG. 2 in the middle-angle position.
Figures 5A, 5B, 5C, 5D:
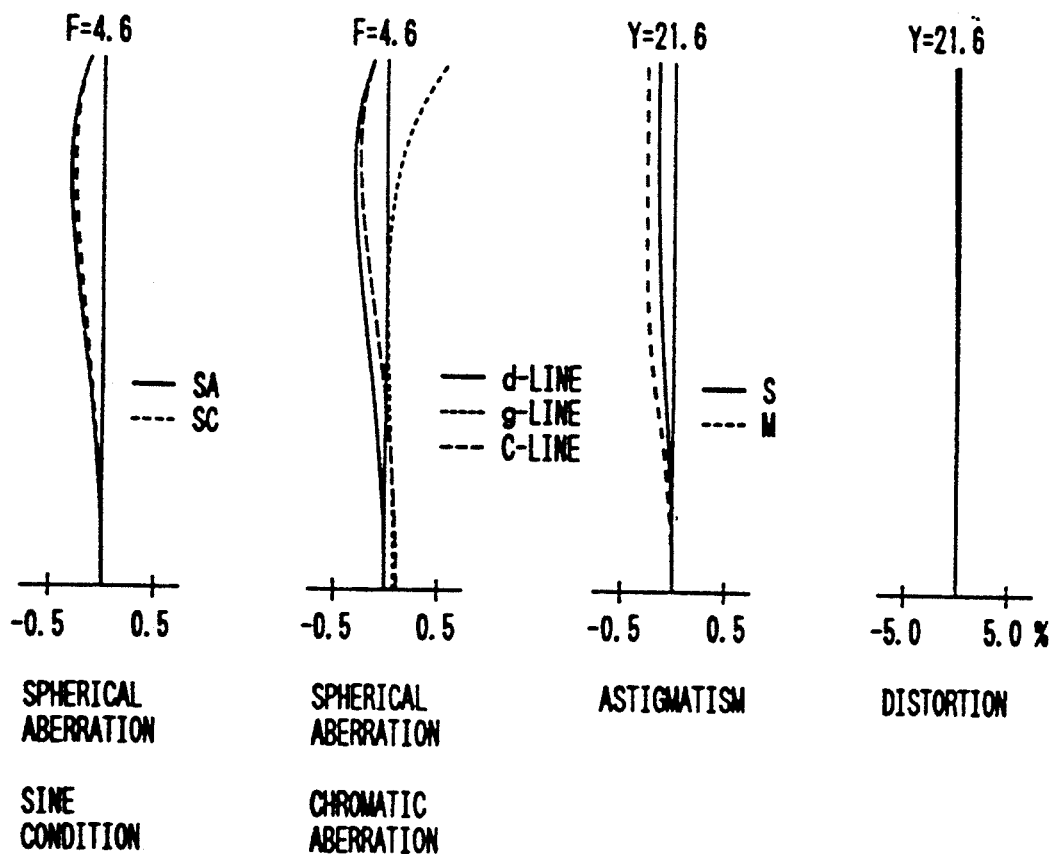
FIGS. 5A-5D are a set of graphs plotting the aberration curves obtained with the lens system of FIG. 4 in the middle-angle position.
Figure 6:
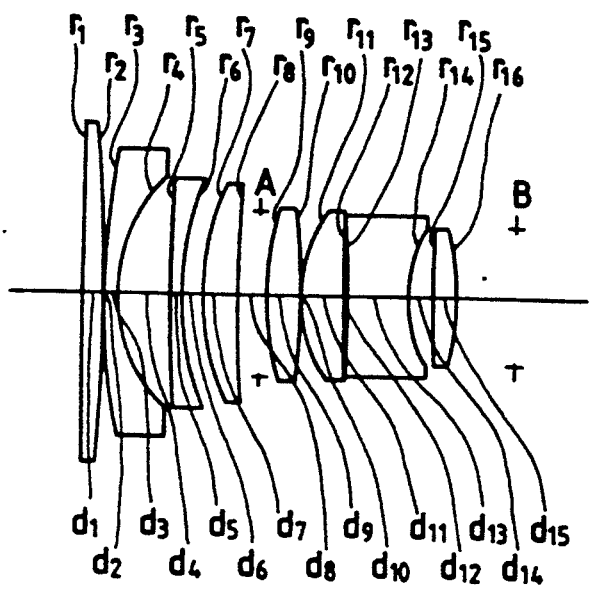
FIG. 6 is a simplified cross-sectional view of the lens system of FIG. 2 at the narrow-angle end.
Figures 7A, 7B, 7C, 7D:
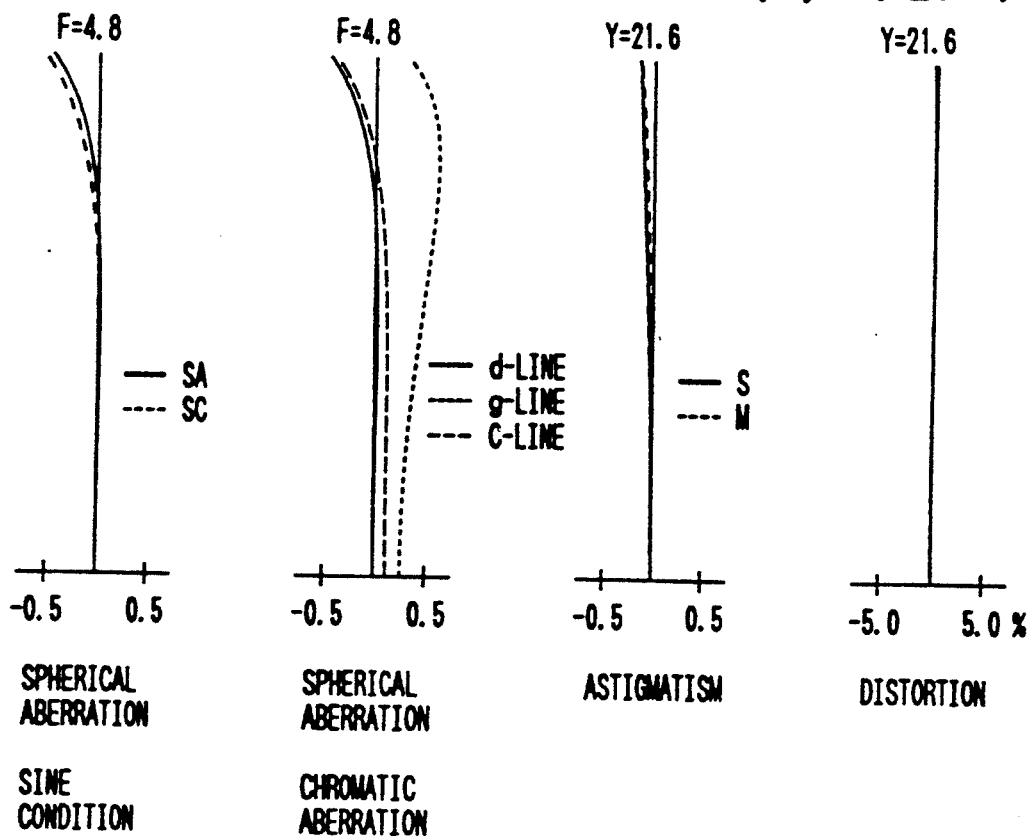
FIGS. 7A-7D are a set of graphs plotting the aberration curves obtained with the lens system of FIG. 6 at the narrow-angle end.

FIG. 4 is a simplified cross-sectional view of the lens system of FIG. 2 in the middle-angle position, and FIGS. 5A–5D are a set of graphs plotting the aberration curves obtained with that lens system. FIG. 6 is a simplified cross-sectional view of the same lens system at the narrow-angle end, and FIGS. 7A–7D are a set of graphs plotting the aberration curves obtained with that lens system.

The lens system of Example 1 is of such a design that diaphragm A and blocking means B move in unison and fs, Xs, ΔXA, ΔXB and ΔX2 were respectively set to satisfy the conditions set forth in Table 3 below.

TABLE 3

| Condition | Value |
|---|---|
| xs/fs | 2.70 |
| ΔXA/fs | 0.87 |
| ΔXB/fs | 0.87 |
| ΔX2/fs | 1.13 |

With the lens system of Example 1, the distance (dA) between diaphragm stop A and positive lens group P, the effective radius (UHA) of the aperture in diaphragm stop A, the distance (dB) between the positive lens group P and the blocking means B, and the effective radius (UHB) of the aperture in blocking means B were set to the values shown in Table 4 below for three different focal lengths, i.e., at the wide-angle end (S), in the middle-angle position (M) and at the narrow-angle end (L).

TABLE 4

| | S | M | L |
|---|---|---|---|
| dA | 8.78 | 2.53 | 1.10 |
| UHA | 8.50 | 9.30 | 11.30 |
| dB | 0.50 | 6.75 | 8.18 |
| UHB | 9.08 | 9.08 | 9.08 |

EXAMPLE 2

Figure 8:
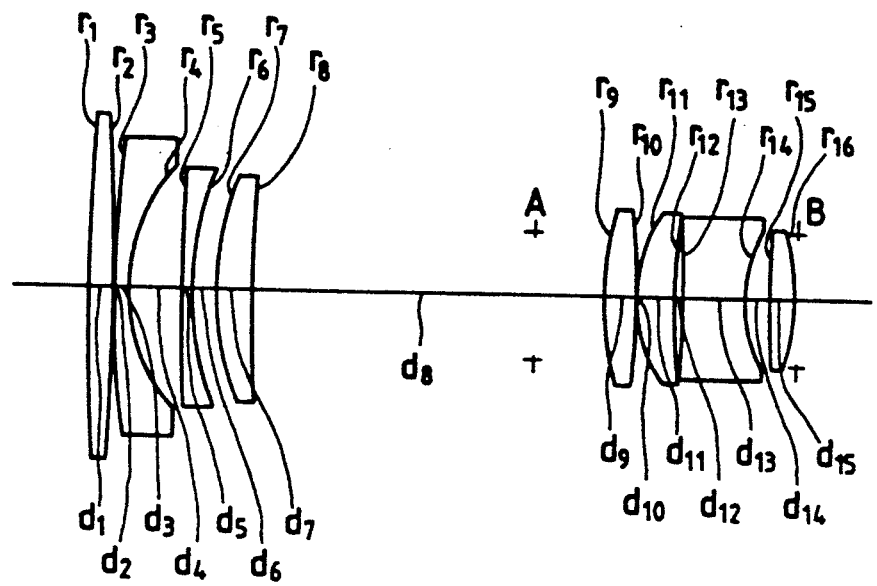
FIG. 8 is a simplified cross-sectional view of the lens system of a second example at the wide-angle end.

FIG. 8 is a simplified cross-sectional view of a zoom lens system according to a second embodiment (Example 2) at the wide-angle end, and FIGS. 9A–9D are a set of graphs plotting the aberration curves obtained with that lens system. Specific numerical data for the lens system are given in Tables 5 and 6.

TABLE 5

| Surface No. | r | d | N | $\nu$ |
|---|---|---|---|---|
| 1 | 316.353 | 3.45 | 1.66755 | 41.9 |

TABLE 5-continued

| Surface No. | r | d | N | ν |
|---|---|---|---|---|
| 2 | −437.002 | 0.15 | — | |
| 3 | 135.689 | 1.93 | 1.83400 | 37.2 |
| 4 | 24.315 | 7.18 | — | |
| 5 | 472.971 | 1.60 | 1.77250 | 49.6 |
| 6 | 43.829 | 3.02 | — | |
| 7 | 38.031 | 4.91 | 1.80518 | 25.4 |
| 8 | 224.796 | variable | — | |
| 9 | 45.404 | 4.18 | 1.72000 | 46.0 |
| 10 | −116.446 | 0.10 | — | |
| 11 | 20.504 | 5.02 | 1.51821 | 65.0 |
| 12 | 108.596 | 0.95 | — | |
| 13 | −220.216 | 8.59 | 1.80518 | 25.4 |
| 14 | 18.632 | 3.30 | — | |
| 15 | 151.515 | 3.19 | 1.57501 | 41.5 |
| 16 | −35.208 | — | — | |

TABLE 6

| Fno. | 1:3.7 | 1:4.6 | 1:4.9 |
|---|---|---|---|
| f | 28.90 | 52.00 | 77.60 |
| ω | 38.5 | 22.7 | 15.5 |
| fb | 43.47 | 55.88 | 69.64 |
| d8 | 47.38 | 16.12 | 3.22 |

Figure 12:
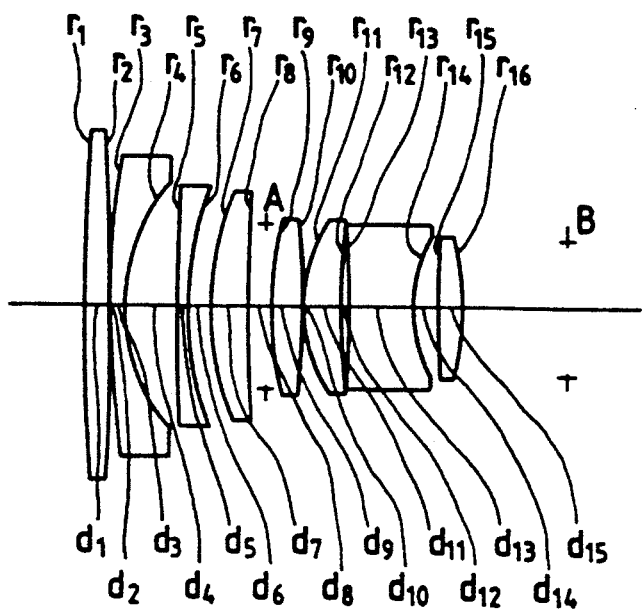
FIG. 12 is a simplified cross-sectional view of the lens system of FIG. 8 at the narrow-angle end.

FIG. 10 is a simplified cross-sectional view of the lens system of FIG. 8 in the middle-angle position, and FIGS. 11A-11D are a set of graphs plotting the aberration curves obtained with that lens system. FIG. 12 is a simplified cross-sectional view of the same lens system at the narrow-angle end, and FIGS. 13A-13D are a set of graphs plotting the aberration curves obtained with that lens system.

The lens system of Example 2 is of such a design that diaphragm A and blocking means B move independently of each other, and fs, Xs, ΔXA, ΔXB and ΔX2 were respectively set to satisfy the conditions set forth in Table 7 below.

TABLE 7

| Condition | Value |
|---|---|
| xs/fs | 2.60 |
| ΔXA/fs | 0.61 |
| ΔXB/fs | 0.43 |
| ΔX2/fs | 0.91 |

With the lens system of Example 2, the distance (dA) between diaphragm A and positive lens group P, the effective radius (UHA) of the aperture in diaphragm A, the distance (dB) between the positive lens group P and the blocking means B, and the effective radius (UHB) of the aperture in blocking means B were set to the values shown in Table 8 below for three different focal lengths, i.e., at the wide-angle end (S), the middle-angle position (M) and at the narrow-angle end (L).

TABLE 8

| | S | M | L |
|---|---|---|---|
| dA | 9.13 | 5.08 | 0.60 |
| UHA | 8.42 | 8.97 | 11.30 |
| dB | 0.50 | 6.98 | 14.159 |
| UHB | 8.90 | 8.90 | 8.90 |

As described above in detail, the present invention provides a zoom lens system in which a lens drive motor can be incorporated without interfering with the diaphragm stop, and which yet is capable of reducing the amount of deleterious flare rays of light.

We claim:

1. A zoom lens system comprising, in order from the object side, a negative first lens group, a diaphragm stop, a positive second lens group and a blocking means capable of moving for blocking deleterious rays of light, said system performing zooming by moving said first and second lens groups, with said diaphragm stop moving independently of said second lens group during zooming, said system satisfying the following conditions:

$$2.5 < Xs/fs < 3.0 \quad (1)$$

$$0 < \Delta XA/fs < \Delta X2/fs \quad (2)$$

$$0 \leq \Delta XB/fs < \Delta X2/fs \quad (3)$$

where Xs is the distance from said diaphragm stop to the image plane at the wide-angle end; fs is the focal length of the overall system at the wide-angle end; ΔXA is the range of movement of the diaphragm stop; ΔXB is the range of movement of the blocking means; and ΔX2 is the range of movement of the second lens group.

2. A zoom lens system according to claim 1, wherein said blocking means moves independently of said second lens group during zooming.

3. A zoom lens system according to claim 2, wherein said diaphragm stop and said blocking means move in unison.

4. A zoom lens system according to claim 1, wherein said blocking means does not include a lens component but is solely composed of a blocking frame.

5. A zoom lens system according to claim 1, wherein said blocking means includes a lens component of small power relative to the respective powers of said first and second lens groups.

6. A zoom lens system according to claim 1, wherein an aperture diameter of said diaphragm stop increases during zooming from the wide-angle and towards the narrow-angle end.

7. A zoom lens system according to claim 1, wherein an aperture diameter of said blocking means varies upon zooming.

8. A zoom lens system according to claim 1, wherein said diaphragm stop moves in unison with a lens component of small power relative to the respective powers of said first and second lens groups, said lens component being independent of said first and second lens groups.

9. A zoom lens system comprising, in order from the object side, a negative first lens group, a first blocking means capable of moving for blocking deleterious rays of light, a positive second lens group and a second blocking means capable of moving for blocking deleterious rays of light, said system performing zooming by moving said first and second lens groups, with said first and second blocking means moving independently of said second lens group during zooming, said system satisfying the following conditions:

$$0 < \Delta XA/fs < \Delta X2/fs$$

$$0 \leq \Delta XB/fs < \Delta X2/fs$$

where fs is the focal length of the overall system at the wide-angle end; ΔXA is the range of movement of said first blocking means; ΔXB is the range of movement of the second blocking means; and ΔX2 is the range of movement of the second lens group.

10. A zoom lens system according to claim 9, wherein said second blocking means does not include a lens component but is solely composed of a blocking frame.

11. A zoom lens system according to claim 9, wherein said second blocking means includes a lens component of small power relative to the respective powers of said first and second lens groups.

12. A zoom lens system according to claim 9, wherein an aperture diameter of said first blocking means increases during zooming from the wide-angle and towards the narrow-angle end.

13. A zoom lens system according to claim 9, wherein an aperture diameter of said second blocking means varies upon zooming.

14. A zoom lens system according to claim 9 wherein said first blocking means moves in unison with a lens component of small power relative to the respective powers of said first and second lens groups, said lens component being independent of said first and second lens groups.

15. A zoom lens system according to claim 9, wherein said first and second blocking means move in unison.

* * * * *